Dec. 27, 1927.

H. ZIMMERMAN

TOOTHPICK

Filed Aug. 16, 1927

1,654,230

INVENTOR.

ATTORNEY.

Patented Dec. 27, 1927.

1,654,230

UNITED STATES PATENT OFFICE.

HENRY ZIMMERMAN, OF DAYTON, OHIO.

TOOTHPICK.

Application filed August 16, 1927. Serial No. 213,348.

This invention relates to improvements in tooth picks. In the accompanying drawings, which serve for illustrating the invention:

The objects attained in the invention consist in a toothpick which is suitably curved at its opposite ends for being applied from outside or inside the tooth line, between back teeth which are not readily accessible with an ordinary straight tooth pick, and which is made of wood, being adapted for low cost production and to be sold at a popular price.

The improved tooth picks are adapted to be made of wood commonly used in the manufacture of toothpicks, straight grain wood, curved with the grain, being preferred to prevent breaking of the toothpicks across the grain.

Figure 1:
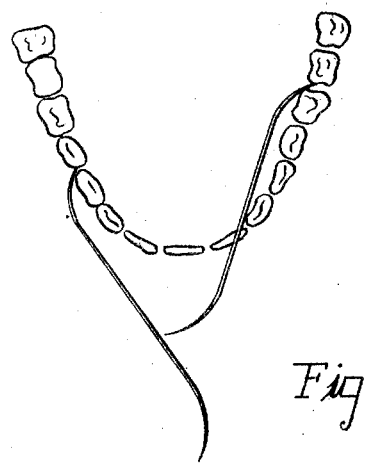
Fig. 1 is a view illustrating the tooth pick as applied to the teeth.
Figure 2:
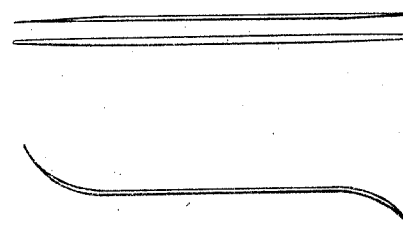
Fig. 2 is a view illustrating the toothpick in the first step of formation.
Figure 3:
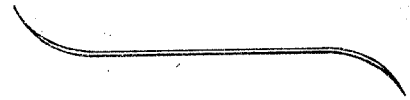
Fig. 3 is a view illustrating the final form of the tooth pick.

To this end the tooth picks are formed straight, as illustrated in Fig. 2, in the first step of production, as in the usual practice. The product is then steamed to render the wood pliable for forming the opposite curved ends, and for maintaining the curvatures when the product dries. The tooth picks are curved, preferably one end inverse to the other.

I am aware of certain forms of metal and quill curved toothpicks produced in the art heretofore, but am not informed that any such earlier forms were commercialized for general use. The earlier forms of curved toothpicks of which I have knowledge are relatively high in cost of production; they could not be manufactured and sold in any quantities at a popular price, and are not known to be on the market at any price. Furthermore, metal toothpicks are not generally approved.

My improved toothpick meets every requirement from the view point of approved material, cost of production and price to the consumer, with the added advantage of being better adapted to the requirements of use.

The use of ordinary machinery is contemplated for producing the tooth picks in straight formation, special apparatus for steaming and curving the ends being in development, which constitutes separate inventive subject matter.

I claim as my invention:

1. A toothpick made of a suitable fiber, as wood, comprising an intermediate straight portion, and opposite ends curved for introducing the same between teeth from outside or inside the tooth line.

2. A toothpick made of suitable fiber, as wood, comprising an intermediate straight portion, and opposite ends curved inversely, one end to the other, for introducing the same between teeth from outside or inside the tooth line.

3. A toothpick made of suitable fiber, as wood, comprising a straight portion, and an end curved with a grain of the fiber for introducing the same between teeth from outside or inside the tooth line.

4. The herein described method of making fiber toothpicks consisting in forming a straight length of fiber, in moistening the fiber for rendering the same pliable, in curving the fiber and causing the curvatures to take permanent form.

In testimony whereof, I affix my signature.

HENRY ZIMMERMAN.